June 18, 1957 V. W. PETERSON 2,796,139
THRUST NUT LOCK
Filed April 13, 1953

INVENTOR
Victor W. Peterson
BY Paul Fitzpatrick
ATTORNEY 2,796,139

THRUST NUT LOCK

Victor W. Peterson, Indianapolis, Ind., assignor to General Motors Corporation, Detroit, Mich., a corporation of Delaware Application April 13, 1953, Serial No. 348,506

5 Claims. (Cl. 170—177)

This invention relates to aircraft engine propeller combinations and more particularly to a thrust nut lock applicable to an aircraft propeller shaft.

In the usual aircraft propeller installation, the propeller shaft extends from a reduction gear case or engine case and is mounted in a bearing or bearings at the forward end of the case. The thrust of the propeller shaft is transmitted to the reduction gear case through these bearings which also, of course, carry transverse loads. The races of the bearings are held in place on the shaft between a shoulder and a thrust bearing nut. Trouble has been experienced with such nuts rotating during service so as to loosen or to become unduly tight. Quite large forces may be generated acting to rotate the thrust nut out of proper tension adjustment.

The purpose of my invention is to provide a simple and extremely reliable and effective arrangement for holding the thrust nut so that no rotation is possible. The locking means is such as to provide for locking of the thrust nut in any desired position with extremely small increments between locking positions. The object of the invention is to hold a propeller shaft thrust nut accurately in its rotational adjustment and to provide simple and absolutely reliable means for this purpose which cannot become dislodged as long as the propeller is in place on the shaft.

It is to be understood, however, that the invention, although particularly adapted for the purpose described, may be applied to other situations. The nature of the invention and the advantages thereof will be more clearly apparent from the succeeding detailed description of the preferred embodiments of the invention. Referring to the drawings.

Figure 1:
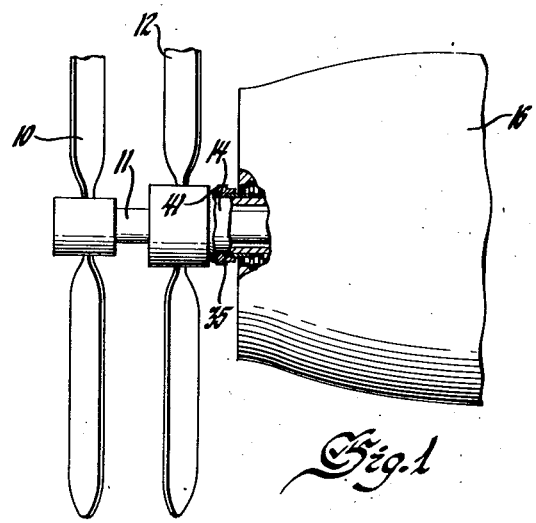
Fig. 1 is a conventional representation of an aircraft reduction gear and propeller combination with a thrust nut lock according to the invention therein.

Referring to Fig. 1, a propeller assembly comprising a first propeller wheel 10 mounted on a shaft 11 and a second propeller wheel 12 mounted on a shaft 14 is shown schematically. The propeller shafts extend from and are mounted in a reduction gear case 16 which contains gearing, the nature of which is immaterial to the present invention, by which the propeller shafts are driven in opposite directions. It is to be understood that the showing of the propellers and the reduction gear in Fig. 1 is not intended to be literal but is such as to illustrate the application of the invention to such an installation.

Figure 2:
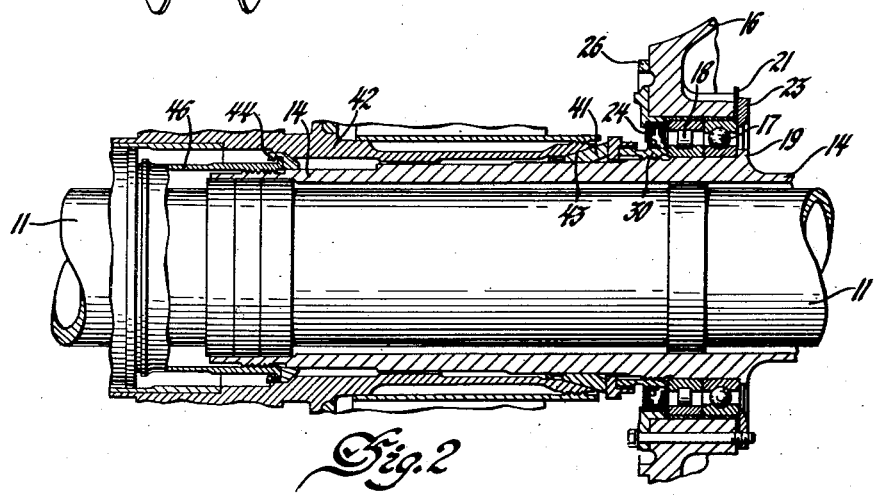
Fig. 2 is a partial view taken in section through the propeller shaft of an installation in accordance with the invention.
Figure 3:
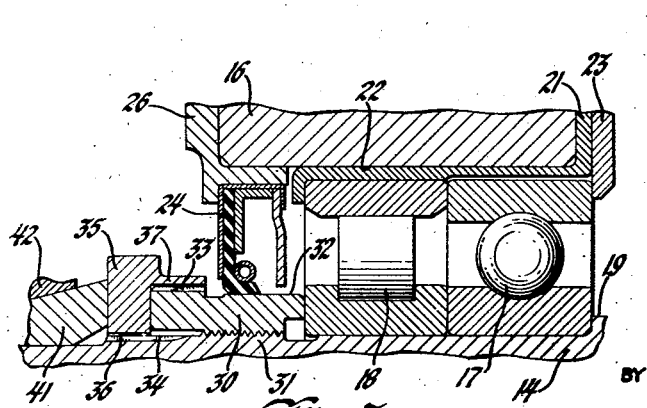
Fig. 3 is an enlarged view of a portion of Fig. 2 showing the thrust nut and lock.

Referring now to Fig. 2, the propeller shaft 11 is shown extending through the propeller shaft 14, both of which project from the nose of the reduction gear case 16. The shaft 14, as shown in Figs. 2 and 3, is supported by a ball bearing 17 and a roller bearing 18, the inner races of which abut. The inner race of the ball bearing 17 engages a shoulder 19 on the propeller shaft. The outer races of the bearings 17 and 18 are mounted in a cage 21 seated within the opening 22 in the reduction gear case 16 and are held in place by a retaining ring 23. An oil seal assembly 24 of known type is retained within the opening 22 by a retaining ring 26. The inner races of the bearings 18 and 17 are held in place by a nut 30 which is internally threaded to engage an externally threaded portion 31 of the propeller shaft, the inner face of the nut engaging the inner race of the bearing 18. The outer surface 32 of the nut includes a cylindrical portion to coact with the oil seal 24 and an externally splined portion 33. The nut may be tightened in place to the required degree of torque, which may be determined by a torque wrench, the splines 33 providing for engagement of the wrench. Adjacent the threaded portion 31 on the propeller shaft 14 is an externally splined section 34. A thrust nut locking ring 35 is internally splined at 36 to engage the splines 34 on the shaft and includes an extension 37 which is internally splined to engage the splines 33 on the nut 30. As will be apparent, when the ring 35 is slid into place engaging both sets of splines, the nut 30 is positively locked against rotation. The two sets of splines may have the same number of teeth, but, in order to provide for more flexible adjustment, the number of teeth may be different. In a preferred embodiment of the invention, one set has 209 teeth and the other set has 219 teeth so that almost infinitesimal variation of the position of the thrust nut is possible.

No special retainer for the collar 35 is required. As will be noted, the collar 35 and nut 30 abut solidly on a radial surface. The propeller structure includes a cone 41, on the shaft 14, which abuts the collar 35. The hub 42 of the propeller comprises an internal conical surface 43 which seats on the cone 41 and a second conical surface which seats on a conical ring 44 tightened on the propeller shaft by a threaded ring or collar 46. The propeller hub is thus retained on the two cones by the collar 46. This is a known propeller mounting and, as will be apparent, with the propeller in place, the locking collar 35 is held from backing off the splines on the shaft 14 and the nut 30.

Figure 4:
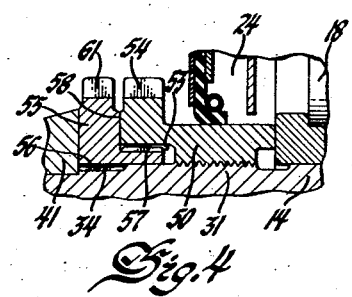
Fig. 4 is a view similar to Fig. 3 of a second form of the invention.

Fig. 4 illustrates a modification of the form of the thrust nut and nut lock which operates according to the same principles as the embodiment previously described and may be installed in the same structure. For this reason, the environmental structure is shown only partially in Fig. 4. The nut 50 of Fig. 4 corresponds to the nut 30 of Fig. 3, is threaded onto the portion 31 of the propeller shaft, abuts the inner race of the bearing 18, and cooperates with the seal 24 in the same manner as the nut 30. The outer end of the nut 50, however, is spaced from the shaft and has formed therein internal splines 53. The enlarged outer end of the nut is also provided with notches 54 for engagement of the nut by a spanner wrench for tightening or disassembly. The locking collar 55 is formed with internal splines 56 cooperating with the splines 34 on the propeller shaft. The collar 55, however, extends internally of the nut 50 and has an externally splined portion 57 cooperating with the splines 53 of the nut 50. These two members engage along the radial surface 58 and are held in such engagement by the propeller cone 41, as previously described. The form of the invention of Fig. 4, as will be apparent, operates in the same way and according to the same principles as that previously described. Specifically, the numbers of teeth in the two spline sets may be different, as previously described. This construction negates the possibility of damage to the splines on the nut 50 in tightening the nut, since they are not employed for that purpose.

Notches 61 may be cut in the rim of the collar 55 to aid in freeing the collar if it is to be removed and the splines are in tight engagement because of the tendency of the nut to creep.

The detailed description herein of preferred embodiments of the invention is not to be considered as limiting the invention since many modifications thereof may be made by the exercise of skill in the art without departing from the principles of the invention.

I claim:

1. In combination, a casing, a propeller shaft extending therefrom, a bearing for the shaft in the casing, means for retaining the bearing in place on the shaft including a nut in threaded engagement with the shaft, the nut having a splined surface, the propeller shaft having a splined surface, a locking collar slidably mounted on the shaft engaging the nut and having splined surfaces engaging the two aforementioned splined surfaces, a propeller on the shaft engaging the collar to retain it in engagement with the splined surfaces, and means retaining the propeller on the shaft.

2. A combination as recited in claim 1 in which the splined surface on the nut is an external surface.

3. A combination as recited in claim 1 in which the splined surface on the nut is an internal surface.

4. In combination, a casing, a propeller shaft extending therefrom, a bearing for the propeller shaft in the casing, means for retaining the bearing in place on the shaft including a nut in threaded engagement with the shaft, a locking collar slidably mounted on the shaft engaging the nut, a propeller on the shaft engaging the collar and retaining it in engagement with the nut, means retaining the propeller on the shaft, the collar having a first spline connection with the nut comprising splines on the collar and mating splines on the nut and having a first number of angular positions of engagement, the collar having a second spline connection with the shaft comprising splines on the collar and mating splines on the shaft and having a second number of angular positions of adjustment, the spline connections locking the collar against rotation relative to the shaft and locking the nut against rotation relative to the collar, the two said numbers having a large lowest common multiple so that the nut may be locked by the locking collar in a large number of angular positions with respect to the shaft.

5. A combination as recited in claim 4 in which the spline connections are defined by axial splines.

References Cited in the file of this patent

UNITED STATES PATENTS

| | | |
|---|---|---|
| 1,317,058 | Wiley | Sept. 23, 1919 |
| 1,418,050 | Bable | May 30, 1922 |
| 1,505,431 | Rollins | Aug. 19, 1924 |
| 1,880,660 | Bauroth | Oct. 4, 1932 |
| 1,920,086 | Lansing | July 25, 1933 |
| 2,313,105 | Walls | Mar. 9, 1943 |
| 2,442,838 | Butterfield | June 8, 1948 |